United States Patent [19]
Kalotay et al.

[11] 3,823,310
[45] July 9, 1974

[54] PULSE TRAIN MODIFICATION CIRCUIT

[75] Inventors: Paul Zoltan Kalotay; George Aloysious Fitzpatrick, both of Monterey Park, Calif.

[73] Assignee: International Telephone and Telegraph Corporation, New York, N.Y.

[22] Filed: Jan. 8, 1973

[21] Appl. No.: 321,662

[52] U.S. Cl............ 235/151.34, 73/231 M, 73/229, 328/60, 328/61
[51] Int. Cl............................................. G01f 1/04
[58] Field of Search.................... 235/151.34, 92 FI; 73/231 R, 231 M, 194 R, 229; 328/60, 61, 45

[56] References Cited
UNITED STATES PATENTS

| | | | |
|---|---|---|---|
| 3,610,898 | 10/1971 | Yamamoto et al............ | 235/151.34 |
| 3,614,892 | 10/1971 | Ottenstein.................. | 235/151.34 X |
| 3,691,838 | 9/1972 | Kalotay...................... | 235/151.34 X |
| 3,699,320 | 10/1972 | Zimmerman et al. ......... | 235/151.34 |

*Primary Examiner*—Charles E. Atkinson
*Assistant Examiner*—Edward J. Wise
*Attorney, Agent, or Firm*—A. Donald Stolzy

[57] ABSTRACT

For the purpose of indicating the total volume of fluid flow in a pipeline corrected to 60° (Fahrenheit) barrels, the pulse train output of a turbine flowmeter is corrected for temperature by eliminating every tenth pulse leaving sets of nine and adding a number of pulses to the sets of nine, which number is directly proportional to that contained in an analog-to-digital converter storage register. The converter is connected to circuits which produce a D.C. voltage proportional to the temperature of the fluid. An inverter, two differentiators and an OR gate are employed to produce pulses at a pulse repetition frequency (PRF) twice that of the incoming pulses. The pulse adding circuit has a set of first, second ... eighth AND gates which receive pulse trains of pulse repetition frequencies f, f/2, f/4, f/8, f/16, f/32, f/64, and f/128, respectively, where f is twice the PRF of the incoming pulses. The first, second ... eighth AND gates are controlled by the first, second ... eighth flip-flop in the register, where the first, second ... eighth flip-flops correspond to the most, next most ... least significant digits of the number contained in the register. An insertion circuit adds the pulses to the sets of nine at a time T/2 before and/or after one pulse in one set of nine, where T = f/2. A divide-by-ten divider is connected from the AND gates to reduce the number of added pulses so that they vary the average number of pulses recorded by a counter that counts the sets of nine plus the added pulses. The number of counted pulses then can vary from 90 percent to about 110 percent of the incoming pulses for register binary numbers from zero to 11111111. An indicator is connected from the counter to indicate the count thereof.

19 Claims, 11 Drawing Figures

1
PULSE TRAIN MODIFICATION CIRCUIT

BACKGROUND OF THE INVENTION

This invention relates to pulse systems, and more particularly, to a circuit for changing the number of pulses in a pulse train.

The number of pulses in a pulse train have been varied in the past by developing a time analog of a predetermined variable from a D.C. voltage analog, and gating out a burst of pulses in accordance with the time analog. For example, see copending application Ser. No. 110,898 filed Jan. 29, 1971, by P. Z. Kalotay for PULSE SYSTEM AND COMPONENTS THEREOF.

Although prior art systems operate satisfactorily in some cases, increased accuracy is still desirable.

SUMMARY OF THE INVENTION

In accordance with the systems of the present invention, the above-described and other disadvantages of the prior art are overcome by adding pulses to those in an incoming pulse train by inserting them in between the latter.

One outstanding feature of the invention resides in generating plural pulse trains of different respective repetition frequencies, the pulse trains being gated out in accordance with the states of the stages or flip-flops in a storage register. Thus, if the register is 1 in an analog-to-digital converter connected from a temperature analog source, and the incoming pulse train is provided by a turbine flowmeter, the incoming pulse train can be corrected, counted and indicated, the indication being equal to or directly proportional to total fluid volume in, e.g. 60° (Fahrenheit) barrels. Such an indication is very useful in the petroleum industry because the volume and density of a petroleum liquid varies with temperature and it is desirable to obtain a measurement in "standard barrels" for billing and other purposes. For example, the BTU content varies with density and it is desirable that the billing be at a constant rate per BTU.

The use of the storage register is an outstanding advantage in that a substantial increase in accuracy is achieved. Moreover, the system of the present invention is less expensive than that of the prior art because the system of the invention makes it possible to eliminate a burst oscillator and a time analog source.

The system of the present invention also has a high speed of response in comparison to those of prior art systems.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

2

DESCRIPTION OF THE PREFERRED EMBODIMENT

Figure 1:
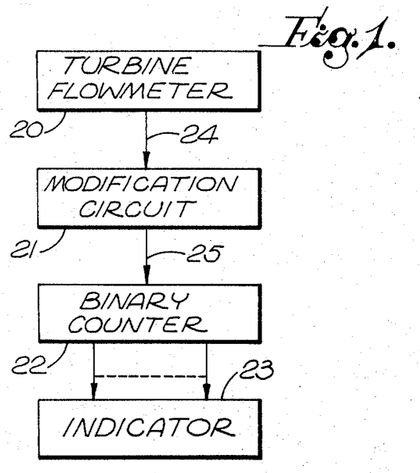
FIG. 1 is a block diagram of a flowmeter constructed in accordance with the present invention.

In the drawing, in FIG. 1, a turbine flowmeter is indicated at 20. A pulse train modification circuit 21, a binary pulse counter 22 and an indicator 23 are connected in succession in that order from turbine flowmeter 20.

Flowmeter 20 is entirely conventional and produces a train of pulses on an output lead 24 at a pulse repetition frequency (PRF) directly proportional to the rate of volume flow through the flowmeter 20. Flowmeter 20 may be connected in or by a part of a pipeline in which petroleum liquid is flowing, if desired, and as is conventional.

Circuit 21 produces a pulse train on an output lead 25. The pulses on output lead 25 are not necessarily equally spaced. In accordance with this disclosure, they are never equally spaced. However, this need not necessarily be true. At any rate, counter 22 counts the number of pulses appearing on lead 25. The total count registered by counter 22 is then directly proportional to 60° barrels. Counter 22 is entirely conventional. So may be the indicator 23. Indicator 23 indicates the total count registered in counter 22. Indicator 23 may be any conventional indicator. Alternatively, it may be simply a row of lamps each connected to the 1 output of each flip-flop in counter 22, none of which are shown.

Circuit 21 changes the total number of pulses from that appearing on lead 24 to that appearing on lead 25. In accordance with the present invention, this change may be made in accordance with any change of any variable. However, one specific example is cited herein. This example is that the circuit 21 changes the number of pulses in accordance with the temperature of the petroleum liquid flowing through turbine flowmeter 20.

Figure 2:
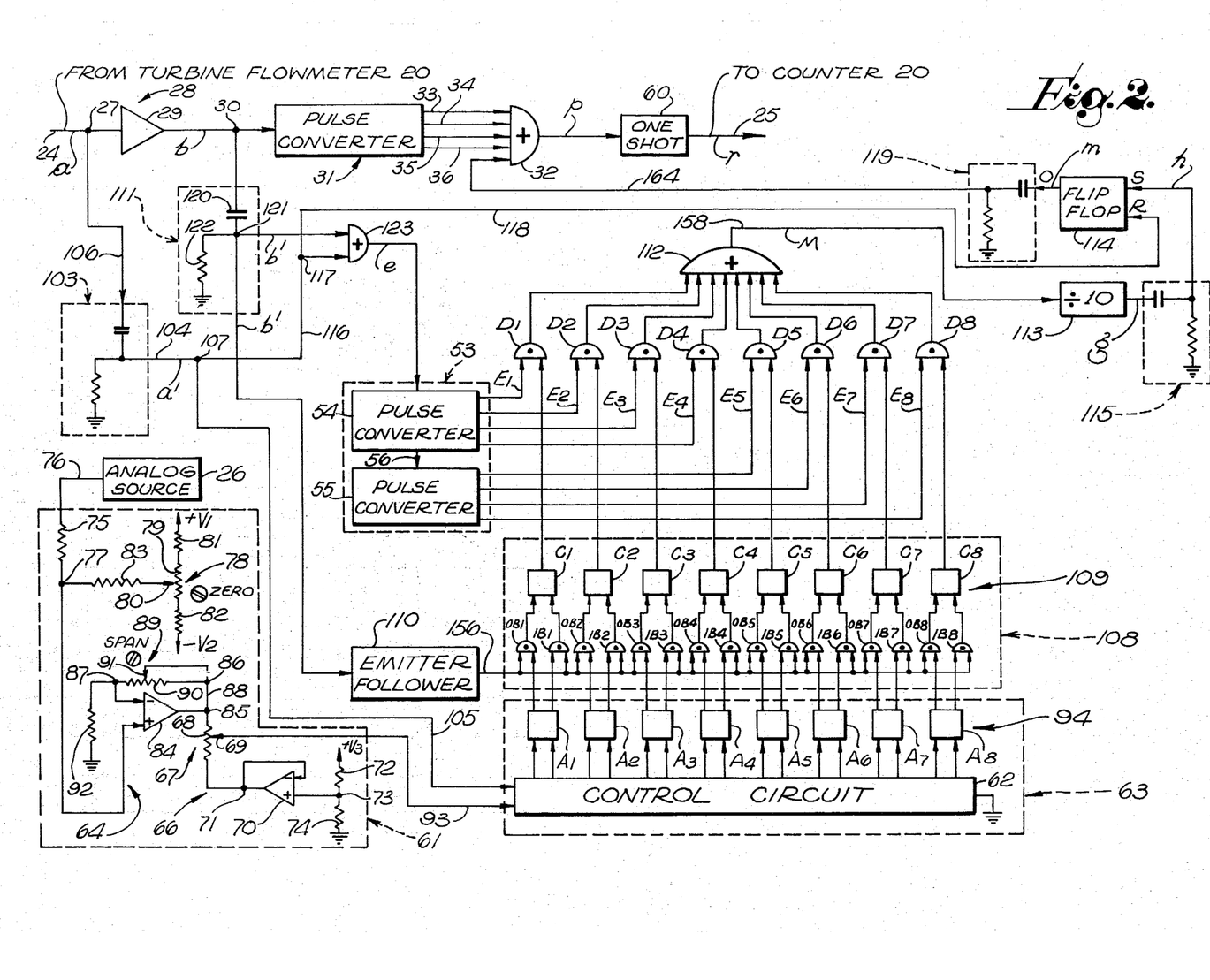
FIG. 2 is a block diagram of a pulse train modification circuit shown in FIG. 1.

Thus, although analog source 26, shown in FIG. 2, may produce any signal which is an analog of any function of any variable, in the one example given, analog source 26 produces a D.C. output current which is directly proportional to the temperature of the said petroleum liquid. Source 26 may be any conventional source. Alternatively, source 26 may utilize a thermistor contiguous to the said petroleum liquid connected in a bridge circuit with other apparatus for producing the said D.C. current analog. None of this structure is shown herein because it is entirely conventional. For example, see copending application Ser. No. 119,491 filed Mar. 1, 1971, by R. E. Talmo for CIRCUIT FOR PRODUCING A TEMPERATURE ANALOG. See also copending application Ser. No. 94,277 filed Dec. 2, 1970, by S. Sapir for VOLTAGE TO CURRENT CONVERTER. The entire specifications and drawings of both of these copending applications are incorporated hereat by this reference hereto as though fully set forth herein.

As shown in FIG. 2, turbine flowmeter output lead 24 is connected to the input junction 27 of an inverter 28 including an amplifier 29 and an output junction 30. A pulse converter 31 is connected from junction 30 to an OR gate 32 via four output leads 33, 34, 35 and 36. Pulse converter 31 may be of the type indicated at 42 in FIG. 5 including an input lead 37 and four output leads 38, 39, 40 and 41.

Figure 5:
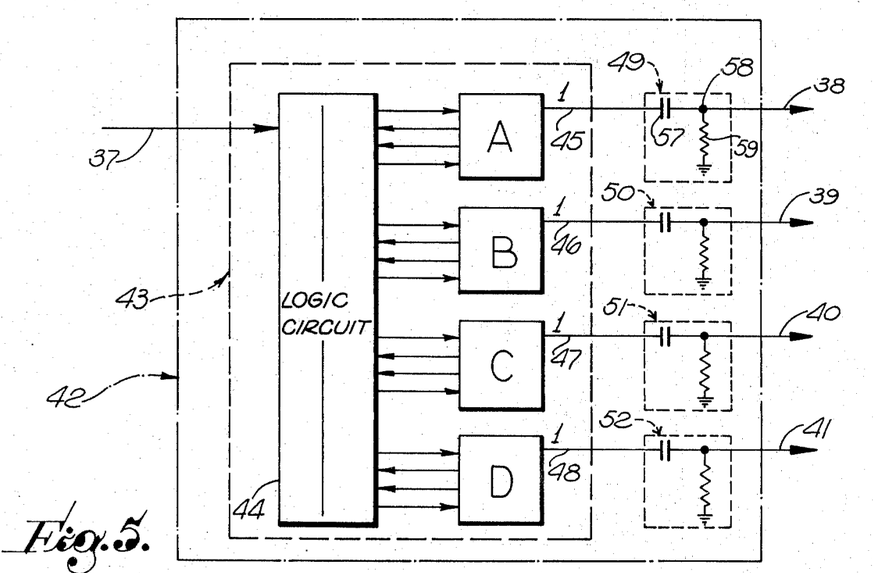
FIG. 5 is a block diagram of a pulse converter shown in FIG. 2.

Converter 42 includes a counter 43 including a logic circuit 44 and flip-flops A, B, C and D connected therefrom. Input lead 37 is connected to logic circuit 44. Flip-flops A, B, C and D have output lead 45, 46, 47 and 48, respectively. Differentiators 49, 50, 51 and 52 are connected respectively from leads 45, 46, 47 and 48 to leads 38, 39, 40 and 41, respectively.

Counter 43 is entirely conventional. The counter corresponding to counter 43 in converter 31 counts to 9, but has 10 stable states. These states are 0, 1, 2 ... 9.

In FIG. 2, a counter 53 is provided which counts to 255, but has 256 stable states. These states are 0, 1, 2 ... 255. Counter 53 may be entirely conventional. Alternatively, counter 53 may include two identical pulse converters 54 and 55. Pulse converter 54 may be identical to pulse converter 31 except that the counter therein counts to 15, but has 16 stable states 0, 1, 2 ... 15. The reset pulse of converter 54 is then applied as the input pulse to converter 55 over a lead 56.

In FIG. 5, differentiator 49 includes a capacitor 57 connected from lead 45 to a junction 58. Junction 58 is connected to lead 38. A resistor 59 is connected from junction 58 to ground.

Differentiator 49 has in the immediately preceding sentences been described in detail. No other differentiator disclosed herein will be described in detail because all of the differentiators are entirely conventional and, in many or all cases, may be identical.

The output of OR gate 32 in FIG. 2 is connected to the input of a one shot multivibrator 60. The output of one shot 60 is connected to lead 25.

For industrial use, conventional analog sources such as source 26 produce an analog current directly proportional to temperature, but within the range of 4.0 to 20.0 milliamperes. If such a source 26 is employed, preferably, but not necessarily, an intermediate circuit 61 is connected from source 26 to one input of a control circuit 62 of an analog-to-digital (A/D)converter 63.

Circuit 61 includes an adjustment circuit 64 and a bias circuit 66. Adjustment circuit 64 includes an output potentiometer 67 having a winding 68 and a wiper 69. Wiper 69 is connected to control circuit 62. The inverting input of differential amplifier 70 is connected to the output thereof at a junction 71. The lower end of potentiometer winding 68 is also connected to junction 71, as viewed in FIG. 2. A resistor 72 is connected from a positive +V3 to a junction 73. A resistor 74 is connected from junction 73 to ground. Junction 73 is connected to the noninverting input of amplifier 70. Circuit 66 thus holds the potential of junction 71 rigidly at one point dependent upon the resistances of resistors 72 and 74 and the potential +V3.

A resistor 75 is connected from the output lead 76 of source 26 to a junction 77. A potentiometer is provided at 78 including a winding 79 and a wiper 80. A resistor 81, winding 79 and a resistor 82 are connected in series in that order from a potential +V1 to a potential −V2. A resistor 83 is connected between junction 77 and wiper 80. Junction 77 is also connected to the noninverting input of a differential amplifier 84. Junctions are then provided at 85, 86 and 87. A lead 88 connects junctions 85 and 86. The output of amplifier 84 and the upper end of potentiometer winding 68 are connected to junction 85. A potentiometer 89 is also provided including a winding 90 connected between junctions 86 and 87, and a wiper 91 connected to junction 86. A resistor 92 is connected from junction 87 to ground. The entire circuit 61 is entirely conventional and receives the said 4.0 to 20.0 milliampere output signal of source 26, and then impresses a D.C. analog voltage on control circuit 62 over lead 93, the ZERO and SPAN of which are adjusted to fit the scale factors of the circuit. A ZERO adjustment can be made by changing the position of wiper 80 on potentiometer 78. The SPAN adjustment may be made by changing the position of wiper 91 on potentiometer 89. Both ZERO and SPAN adjustments may be made with a screwdriver, if desired, as is conventional.

In addition to circuit 62, converter 63 includes a storage register 94 having flip-flops A1, A2, A3, A4, A5, A6, A7 and A8. Circuit 62 is connected from a differentiator 103 over leads 104 and 105, and from circuit 61 over lead 93 to the flip-flops in register 94. Converter 63, being conventional, thus is periodically actuated by pulses on lead 104 to set register 94 in accordance with the magnitude of the D.C. voltage appearing on lead 93, the D.C. voltage appearing on lead 93 being characterized to follow the American Petroleum Institute Table VI, and proportional to temperature.

Differentiator 103 is connected from junction 27 over a lead 106 to a junction 107 via lead 104. Lead 105 is connected from junction 107 to circuit 62.

A memory circuit 108 is connected from converter 63 to AND gates D1, D2, D3, D4, D5, D6, D7 and D8.

Circuit 108 includes a set of AND gates 0B1, 1B1, 0B2, 1B2, 0B3, 1B3, 0B4, 1B4, 0B5, 1B6, 0B6, 1B6, 0B7, 1B7, 0B8 and 1B8.

Circuit 108 also includes a storage register 109 including flip-flops C1, C2, C3, C4, C5, C6, C7 and C8.

Figure 4:
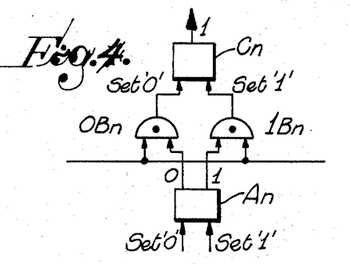
FIG. 4 is an enlarged block diagram of a portion of the blocks shown in FIG. 2.

A flip-flop An, shown in FIG. 4, represents a typical flip-flop A in storage register 94. Note will be taken that a connection is made from both the 0 and 1 outputs of flip-flop An to corresponding AND gates 0Bn and 1Bn. The outputs of AND gates 0Bn and 1Bn are connected respectively to the set 0 and set 1 inputs of flip-flop Cn which represents a typical one of the flip-flops C in register 109.

The 1 outputs of each of flip-flops C1-C8, inclusive, are connected to the inputs of the AND gates D1–D8, inclusive, respectively.

Each of the AND gates 0B1–0B8, inclusive, and each of the AND gates 1B1-1B8, inclusive, also receive a pulse input from an emitter follower 110 connected from a differentiator 111. Differentiator 111 is, in turn, connected from junction 30.

Counter 53 has outputs E1, E2, E3, E4, E5, E6, E7 and E8 connected respectively to inputs of AND gates D1, D2, D3, D4, D5, D6, D7 and D8.

The outputs of AND gates D are connected to the input of an OR gate 112. The output of OR gate 112 is connected to a divide-by-10 divider 113. A flip-flop is provided at 114. A differentiator 115 is connected from the output of divider 113 to the set input of flip-flop 114.

A lead 116 connects a junction 117 with junction 107. A lead 118 is connected from junction 117 to the reset input of flip-flop 114. A differentiator 119 is connected from the 0 output of flip-flop 114 to another input of OR gate 32.

Figure 3:
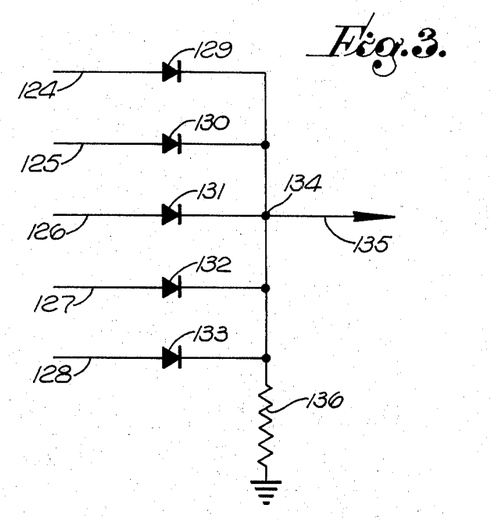
FIG. 3 is a schematic diagram of an OR gate shown in FIG. 2.

As before, differentiator 111 includes a capacitor 120 connected from junction 30 to a junction 121. Emitter follower 110 is then connected from junction 121. A resistor 122 is connected from junction 121 to ground. An OR gate 123 is connected from junctions 117 and 121 to counter 53. OR gate 32 may be any conventional OR gate including, but not limited to, that shown in FIG. 3. The OR gate of FIG. 3 has input leads 124, 125, 126, 127 and 128. Diodes 129, 130, 131, 132 and 133 are connected respectively from leads 124, 125, 126, 127 and 128 to an output junction 134. An output lead 135 is connected from output junction 134. A resistor 136 is connected from junction 134 to ground.

Similarly, OR gate 112 may be any conventional OR gate including, but not limited to, a "wire OR."

OR gate 123, and any of the other OR gates disclosed herein, may also be NOR gates, if desired. For example, if gate 123 is a NOR gate, gate 112 is a wire OR, and counter 53 is entirely conventional and produces an output pulse on one or more of the leads E immediately after the reset of a pulse from gate 123, a sufficient delay may be provided from the input of gate 123 to the set input of flip-flop 114 to, at all times, prevent the set and reset inputs of flip-flop 114 from receiving pulses coincident in time.

If desired, a delay device may be connected from differentiator 115 to the set input of flip-flop 114 or between junction 117 and the reset input of flip-flop 114. However, in many cases, no delay device whatsoever will be required.

Figure 6:
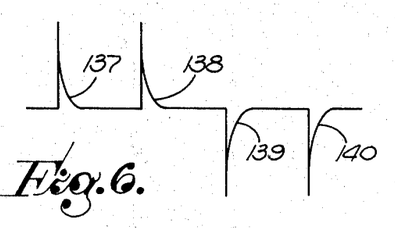
FIGS. 6, 7, 8, 9 and 10 are graphs of groups of waveforms characteristic of the operation of the pulse train modification circuit shown in FIG. 2.

In FIG. 6, positive differentiated pulses are indicated at 137 and 138. Also in FIG. 6, negative differentiated pulses are indicated at 139 and 140. All of the positive pulses illustrated herein as a single vertical line have the shape of one of the positive pulses 137 and 138. They are illustrated as single lines only for clarity. Similarly, all of the negative pulses herein represented as a single line have the shape of one of the negative pulses 139 and 140.

Figure 7:
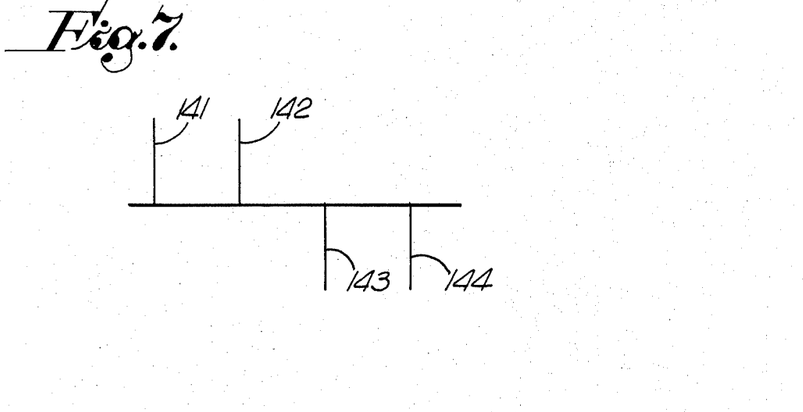

The voltage scale of FIGS. 6 and 7 is greater than that illustrated in all of the FIGS. 8, 9, 10 and 11 to illustrate in greater detail the shape of the pulses corresponding to pulses 137, 138, 139 and 140.

In FIG. 7, pulses 141, 142, 143 and 144 correspond respectively to pulses 137, 138, 139 and 140 in FIG. 6.

In FIG. 2, the pulses on input lead 24 from turbine flowmeter 20 may vary in pulse repetition frequency. However, this variation will be rather slow. For purposes of explanation, the frequency can be assumed to be, for a short time or a long time, to be constant. The pulses appearing on lead 24 are pulses *a*, shown in FIG. 8. Inverter 29 has an output appearing at junction 30 which is then *b*, shown in FIG. 8. Pulses then appear at the output of differentiator 103 on lead 104 as indicated at *a'* in FIG. 8. Pulses also appear at the output junction 121 of differentiator 111 as indicated at *b'* in FIG. 8.

Figure 8:
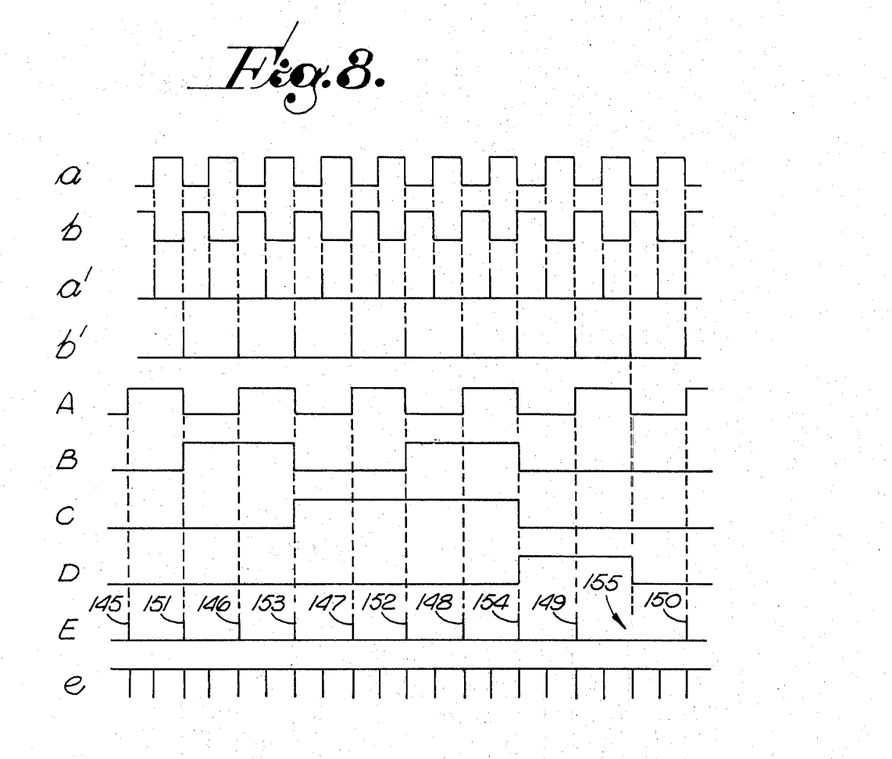

The counter in converter 31, of the type shown in FIG. 5, then produces output pulses as indicated in FIG. 8. For example, the 1 outputs of the flip-flops A, B, C and D are indicated at A, B, C and D, respectively, in FIG. 8.

In FIG. 8, waveform E represents the output of OR gate 32 produced by pulses on leads 33, 34, 35 and 36, shown in FIG. 2. However, waveform E omits the pulses added by OR gate 32 which appear at the output of differentiator 119. Pulses 145, 146, 147, 148, 149 and 150 correspond to pulses that appear on output lead 33 in FIG. 2. Pulses 151 and 152 are those which appear on output lead 34 in FIG. 2. Pulse 153 corresponds to the output in lead 35 in FIG. 2. Pulse 154 corresponds to the output lead 36 in FIG. 2. In FIG. 2, leads 33, 34, 35 and 36 correspond to leads 38, 39, 40 and 41 in FIG. 5.

In FIG. 8, note will be taken that a pulse is missing at position 155. This is because reset occurs at this position. Converter 31 has ten stable states. Thus, when it is reset, there is no pulse output on any of the leads 33, 34, 35 or 36.

Except where negative pulses are produced to accomplish some purpose, in general, the use of a positive pulse may be made. Circuit components employed to respond to positive pulses will not respond to negative pulses. It is, therefore, unnecessary to consider negative pulses. Moreover, if negative pulses become troublesome, short-circuiting diodes may be provided, if desired.

Although some negative pulses may be incidentally produced and not used, these have been omitted from the waveforms shown herein for clarity.

Although only one "empty space" has been shown at 155 in FIG. 8, it is to be understood that this "empty space" occurs for every tenth input pulse to converter 31 from junction 30. Thus, nine consecutive pulses are produced between each immediately succeeding "empty space" at the output of OR gate 32 corresponding to the pulses which appear upon leads 33, 34, 35 and 36.

Note will be taken that the empty spaces are created because only positive pulses are considered. See E in FIG. 8. The differentiator, in each case, produces a positive pulse at the leading edge of each of the positive pulses A, B, C, and D in FIG. 8. However, the circuit is insensitive to any negative pulses produced by the differentiators.

In general, the overall effect of converter 31, OR gate 32 and the pulse output of differentiator 119 is to reduce the number of input pulses by 10 percent, and to insert 0, 1 or more pulses which appear at the output of differentiator 119.

It is a feature of the present invention that the output of circuit 61 is "digitally divided" into 256 parts, 255 which may be added in some proportion to the pulses impressed upon OR gate 32 via leads 33, 34, 35 and 36. This makes it possible to convert a D.C. analog voltage to a digital number which is generally more suitable for control purposes than the D.C. voltage is itself. Maximum accuracy is thus obtained. In the pulse train modification circuit, modification is thus obtained with minimum error. That is, the only error that exists is the error in the D.C. input voltage rather than in the modification circuit.

It is also a feature of the invention that a high resolution digital device is possible because a pulse train is impressed uon counter 53, as indicated at *e* in FIG. 8, when gate 123 is a NOR gate. Note that the pulse train *e* has a pulse repetition frequency (PRF) which is twice that of the input pulse train *a*. This double frequency pulse train is obtained by differentiating both the input and output of inverter 29 and adding both of these differentiated pulse trains together in gate 123.

The output of emitter follower 110 is impressed upon the gates B in circuit 108 via a lead 156. The pulses appearing on lead 156 may be substantially identical to those appearing at junction 121 in differentiator 111, shown in FIG. 2, and as indicated at b' in FIG. 8.

Figure 9:
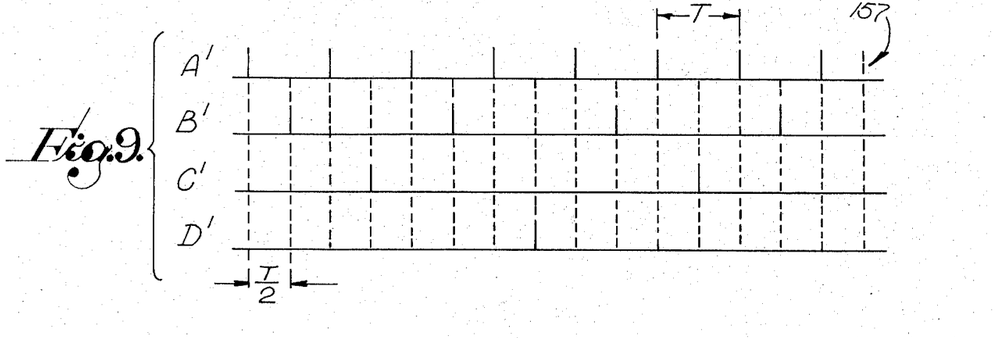

FIG. 9 illustrates at A', B', C' and D' what the corresponding pulses are on leads E1, E2, E3 and E4, respectively. Note will be taken that there is an empty space at 157. The counter of converter 54 thus counts to fifteen and resets at the empty space 157 where no pulse is generated. In other words, the counter of converter 54 is reset on the 16 pulse. However, each of the reset pulses is counted by the counter in converter 55. This means that, in counter 53, there is only one empty space out of 256 counts. The converter 55 thus fills all of the empty spaces 157 out of sixteen except one.

As used in connection with FIG. 9, the phrase "empty space" means that there is no pulse at A', B', C' or D'. Note will be taken that in FIG. 9, there is at least one pulse in at least one of the horizontal lines in the position of each of the dotted lines except at 157.

Note will be taken in FIG. 9 that each empty space 157 occurs a period of time $8T$ after each next preceding empty space, where $T$ is the period of the pulse train $a'$.

With a different time scale, FIG. 9 can accurately represent the pulses on the output leads of converter 55. For example, the pulses at A', B', C' and D' may be identical to those appearing on leads E5, E6, E7 and E8, respectively. In this case, note will be taken that, not shown in FIG. 9, a maximum of fifteen pulses occur on leads E1, E2, E3 and E4 during each period $T/2$, shown in FIG. 9.

In the operation of analog-to-digital converter 63, the order of each corresponding flip-flop in register 94 represents what the digit is for that digit place. For example, if the 1 output of flip-flop A1 is high, that means that the most significant digit is 1. If the 1 output of flip-flop A1 is low, that means that the most significant digit is 0.

Note will be taken from FIG. 9 that the frequencies of the pulses on leads E are weighted. For example, the frequency of the output pulses on lead E1 is equal to half of the frequency of the input pulses to counter 53 from gate 123. Thus, if the PRF of the pulses on lead E1 is equal to $f$, the PRF of the pulses appearing on lead E2 will be $f/2$, the PRF of the pulses appearing on lead E3 will be $f/4$, the PRF of the pulses appearing on lead E4 will be $f/8$, the PRF of the pulses appearing on lead E5 will be $f/16$, the PRF of the pulses appearing on lead E6 will be $f/32$, the PRF of the pulses appearing on lead E7 will be $f/64$ and the PRF of the pulses appearing on lead E8 will be $f/128$.

Since the A/D converter register 94 has weighted outputs from flip-flops A, and since the PRF's on the leads E to AND gates D are likewise weighted, OR gate 112 produces a number of output pulses directly proportional to the digital number stored in A/C converter register 94. This is true because pulses b' transfer the number in register 94 to register 109. Register 109 thus generally carries the number of register 94 delayed only by a very short time.

In some cases, memory circuit 108 may be omitted, and register 94 connected directly to gates D. Emitter follower 110 may thus be omitted, as well.

Memory circuit 108 is employed simply for isolation. The register of a conventional A/D converter produces output pulses upon completing conversion. During conversion, outputs are not present. This can cause an error. Circuit 108 thus prevents any unwanted pulse outputs of register 94 from being impressed upon AND gates D.

Notwithstanding the foregoing, it is also possible to obtain A/D converters which have no such unwanted pulse outputs. It is thus possible to omit memory circuit 108 in this case.

In FIG. 2, note will be taken that counter 53 receives a pulse train having 200 percent of the pulses appearing on input lead 24. This percentage is reduced to 20 percent by divider 113. It is thus possible to increase the input pulse reduction from 90 percent to 110 percent. It is, therefore, possible to produce a total number of pulses which is either less than or greater than the total number appearing upon input lead 24 in FIG. 2. Note that 113 can divide by any number, thus producing corrections more or less than the indicated ±10 percent. For example, divide by 5 results in ±20 percent while divide by 16 gives ±6.25 percent.

Figure 10:
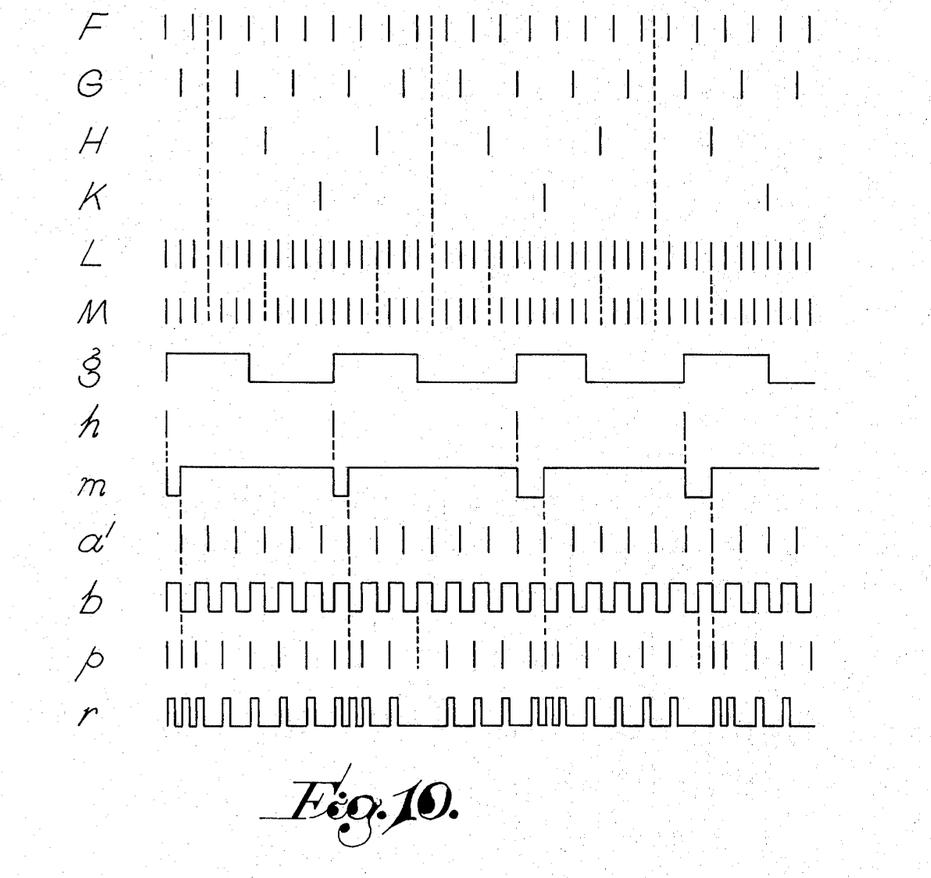

For purpose of explanation, it can be assumed that the flip-flops A1, A2, A3, A4, A5, A6, A7 and A8, respectively, are set to the states 0, 0, 0, 0, 1, 1, 0, and 1 corresponding to the binary number 00001101. The output pulses on leads E5, E6, E7 and E8 can then be represented as indicated at F, G, H and K, respectively, in FIG. 10. If all the pulses on lines F, G, H and K are added together, the appear as in L in FIG. 10. However, since the next to the last significant digit is 0, i.e., the 1 output of flip-flop A7 in register 94 is low, none of the pulses H are passed by AND gate D7. The output of OR gate 112 is then indicated at M. Note will be taken that the pulses in FIG. 10 are identical to the pulses L with the exception that the pulses H have been omitted. The reference letter M is indicated adjacent the output lead 158 or OR gate 112 in FIG. 2.

The output of divider 113 is indicated at g in FIG. 10. Every five pulses, waveform g is high. The remainder of the time, it is low. However, the pulses shown in waveform g are not necessarily all of the same width. This is true because there are gaps in the pulse train M as indicated at 159.

The waveform at the output of differentiator 115 and at the input of flip-flop 114 is then indicated at $h$ in FIG. 10. The waveform at the 0 output of flip-flop 114 is then indicated at $m$ in FIG. 10.

The waveform $a'$ is copied from FIG. 8 into FIG. 10 with change in time scale which is appropriate to the time scale of the other waveforms in FIG. 10. The same is true of waveform $b$.

In FIG. 10, note will be taken that the product of a positive pulse on the 0 output of flip-flop 114 causes extra pulses 160, 161, 162 and 163 to be generated on the output lead 164 of differentiator 119, as shown in FIG. 2. The pulses 160, 161, 162 and 163 are indicated in the same line with pulses $a'$ in FIG. 10. The output of OR gate 32 is then indicated at p in FIG. 10 with pulses inserted at 165, 166, 167 and 168 at time positions substantially identical to those of pulses 160, 161, 162 and 163.

Thus, pulses 165, 166, 167 and 168 all appear on input lead 164 to OR gate 32 and all the other pulses on the line p appear on the leads 33, 34, 35 and 36.

The pulses on the line p in FIG. 10 are then converted to pulses having a somewhat greater width by one-shot 60. The output of one-shot 60 on lead 25 is thus indicated at *r* in FIG. 10.

OPERATION

In the operation of the embodiment of the invention shown in FIG. 2, the pulse converter 31 with OR gate 32 subtracts 10 percent of the incoming pulses and adds to the remaining 90 percent, pulses on lead 164 that are impressed on one of the five inputs to OR gate 32.

Analog-to-digital converter 63 converts the D.C. voltage appearing on input lead 93 to control circuit 62 to a digital number carried by storage register 94. The number carried by register 94 is then periodically transferred to storage register 109 each time a pulse appears upon lead 156 connected to each of the AND gates B.

The PRF of the signal appearing on each of the AND gate input leads E is different and weighted according to the digit position of a corresponding flip-flop C. The output of OR gate 112 on lead 158 then is, for each 256 input pulses to counter 53, directly proportional to the amplitude of the D.C. voltage appearing on lead 93. During the said 256 input pulse transfer, OR gate 112 may produce from 0 to 255 pulses. These pulses are divided by ten by divider 113. The number of pulses appearing at the output of differentiator 115 is from 0 to merely 20 percent (255/256 times 20) of the input pulses appearing on lead 24. It is, therefore, possible to add from 0 to about 20 percent of the input pulses on lead 164 to the 90 percent appearing on leads 33, 34, 35 and 36 for a variation in input pulse number of from 90 percent to 110 percent.

One-shot multivibrator 60 thus produces a number of pulses which may be less than (from 90 percent to 100 percent), equal to or greater than (from 100 percent to 110 percent) the number of input pulses appearing on lead 24.

From the foregoing, it will be appreciated that by dividing the analog voltage appearing on lead 93 into a possible 255 parts, it is possible to modify the incoming pulse train on input lead 24 to that on output lead 25, shown in FIG. 2, without any loss of accuracy. It is also a feature of the invention that maximum pulse resolution is obtained in that each pulse appearing on lead 14 is never closer in time to any of the pulses appearing on leads 33, 34, 35 and 36 than a time equal to the reciprocal of the PRF of the output signal of OR gate 123. Described loosely, the pulses on lead 164 are always inserted precisely midway between any immediately adjacent pairs of pulses appearing on the leads 33, 34, 35 and 36. This is a loose statement because the pulses may, in fact, have a greater spacing to some extent because when all the pulses on leads 33, 34, 35 and 36 are added together, the tenth pulse is always missing anyway.

DEFINITIONS

The phrase NOR gate is hereby defined for use herein and in the claims to mean either an OR gate or a NOR gate, a NOR gate generally being the same as or equivalent to an OR gate followed by an inverter. Similarly, AND gates D may be NAND gates.

The phrase AND gate as used herein and in the claims is, therefore, hereby defined for use herein and in the claims to mean either an AND gate or a NAND gate, a NAND gate conventionally being the same as or equivalent to an AND gate followed by an inverter.

The number of flip-flops A in storage register 94 may, of course, be varied. In general, there will be, of course, at least two flip-flops A and preferably several more.

The counter of pulse converter 31 may contain any number of flip-flops, but preferably includes at least two and one or two or more than two more than that. Thus, the number of flip-flops in the counter of pulse converter 31 may be described in the general case as being n in number. Further, the outputs of these flip-flops may be connected, through differentiators or not, in any circuit to produce combined outputs such that every $m$th input pulse is omitted. In this case, $m$ is not less than two.

Divider 113 need not necessarily divide by 10 but in the general case may divide by $q$.

In other special cases, $n$ may equal 4 and $m$ may equal 10 while $q$ may equal 10. In another specific case, $p$ may equal 8, where $p$ is the number of flip-flops C in storage register 109.

To summarize, source 26 in FIG. 2 may produce a D.C. current directly proportional to any variable including, but not limited to, temperature. The said any variable, for example, may include, but not be limited to, pressure or some other variable.

The utility of the present invention is not limited to producing a temperature corrected pulse train so that total volume flow in a pipeline may be indicated in 60 degree barrels.

In FIG. 8, waveform a may be a square wave with a mark-to-space ratio of 1:1, if desired. However, this wave shape is not extremely critical and merely preferable.

The phrase "means to supply input pulses" is hereby defined for use herein and in the claims to mean turbine flowmeter 20 or any such means equivalent or not equivalent to turbine flowmeter 20, or simply a conductive lead or other conductive structure. That is, the last quoted phrase may or may not include and is not limited to either a circuit component or a conductive lead and/or not a circuit component.

If desired, $q$ may be smaller than, equal to or larger than 10 and/or an additional divider may be inserted in the circuit of FIG. 2 between junction 30 and pulse converter 31. Although the arrangement shown in FIG. 2 is preferred, divider 113 may be inserted in the electrical lead connecting the output of gate 123 and the input of counter 53.

The PRF of the output signal of gate 123 may be equal to or different from that of the PRF of the incoming pulse train appearing on the input lead 24.

The phrase "circuit to produce first pulses" is hereby defined for use herein and in the claims to mean exactly the same thing as "means to supply input pulses" as defined hereinbefore.

The same is true of the phrase "means connecting."

Figure 11:
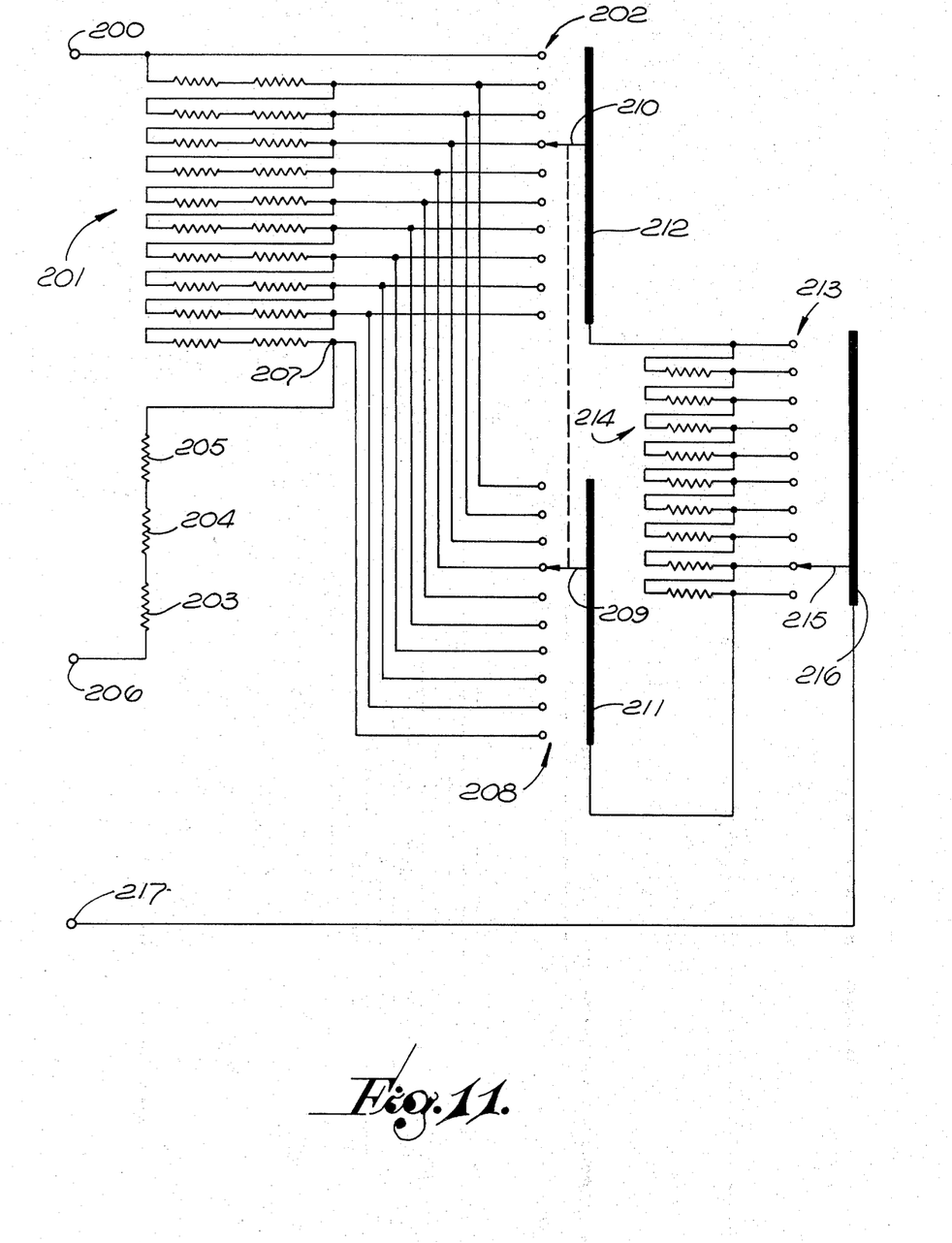
FIG. 11 is a schematic diagram of a manually adjustable function generator.

FIG. 11 is a schematic diagram of a Kelvin-Varley manually adjustable function generator which may be substituted for potentiometer 67 in FIG. 2.

In FIG. 11, an input terminal 200 has a bank 201 of resistors connected to switch contacts 202. Resistors 203, 204 and 205 are connected from a reference terminal 206 to a junction 207.

A second set of switch contacts 208 have a wiper 209. Contacts 202 have a wiper 210 ganged with wiper 209.

Wiper 209 is always in contact with a conductive bar 211. Wiper 210 is always in contact with a conductive bar 212. Bars 211 and 212 are connected across a set of switch contacts 213 which have a resistor bank 214 connected thereto.

A wiper 215 engages contacts 213. Wiper 215 always engages a conductive bar 216 which, in turn, is connected to an output terminal 217.

The circuit of FIG. 11 may be entirely conventional except for the resistances of all the resistors shown in FIG. 11. The resistances of the resistors shown in FIG. 11 are selected so that the signal at terminal 217 is a fraction of the signal at terminal 200, which fraction is directly proportional to the specific gravity of oil when the wipers are set to the American Petroleum Institute "Gravity," G given by the formula $$G = 141.5/S - 131.5$$

where $S$ is specific gravity.

The circuit of FIG. 11 may be combined with that of FIG. 2 by connecting 200 from junction 85, 206 from junction 71 and 217 to lead 93.

What is claimed is:

1. A pulse train modification circuit, said circuit comprising: first means to supply discrete input pulses; second means connected from said first means to supply discrete first output pulses in synchronism with said input pulses; a storage register; third means to vary the contents of said register in direct proportion to the magnitude of a predetermined variable; and fourth means connected from said first means and from said register to insert a predetermined number of discrete second output pulses in between corresponding immediately adjacent pairs of said first output pulses, said predetermined number being directly proportional to the number stored in said register.

2. The invention as defined in claim 1, including utilization means connected to receive said first and second output pulses in a single pulse train.

3. The invention as defined in claim 2, wherein said first means includes a turbine flowmeter, said third means including fifth means to provide a D.C. voltage directly proportional to the temperature of the fluid flowing through said flowmeter and sixth means connected from said fifth means to said register to vary the contents of said register in direct proportion to the amplitude of said D.C. voltage.

4. The invention as defined in claim 3, wherein said utilization means includes a pulse counter connected from said fourth means and an indicator connected from said counter, said indicator indicating visually the magnitude of the count in said counter.

5. The invention as defined in claim 2, wherein said utilization means includes a pulse counter connected from said fourth means and an indicator connected from said counter, said indicator indicating visually the magnitude of the count in said counter.

6. The invention as defined in claim 1, wherein said second means includes an inverter connected from said first means, a first binary digital pulse counter connected from said inverter, said first counter having n flip-flops, a first OR gate, a differentiator connected from the 1 output of each first counter flip-flop to said first OR gate, a logic circuit connected from said inverter to said first counter flip-flops, said logic circuit being adapted to reset said flip-flops every $m^{th}$ input pulse thereto where $n$ and $m$ are positive integers, $m$ being not less than 2, a second binary digital pulse counter having first, second, third ... $p^{th}$ flip-flops, a second OR gate, a first auxiliary differentiator connected from said first means to said second OR gate, a second auxiliary differentiator connected from said inverter to said second OR gate, said second counter having a logic circuit connected from said second OR gate to said second counter flip-flops, first, second, third ... $p^{th}$ AND gates, first, second, third ... $p^{th}$ differentiators connected from the 1 outputs of said first, second, third ... $p^{th}$ second counter flip-flops, respectively, to the inputs of said first, second, third ... $p^{th}$ AND gates, respectively, said first, second, third ... $p^{th}$ second counter flip-flops producing pulses at the 1 outputs thereof at pulse repetition frequencies $f$, $f/2$, $f/4$, ... $f/p$, respectively, where $f$ is 2 times the pulse repetition frequency of the input pulses supplied by said first means, an analog-to-digital converter including a control circuit and a storage register connected therefrom, means to supply a D.C. voltage to said control circuit of an amplitude variable in direct proportion to the magnitude of a predetermined variable, an auxiliary storage register, means connected from said second auxiliary differentiator and said converter register to said auxiliary register to enter the contents of said converter register into said storage register when a pulse appears at the output of said second auxiliary differentiator, said auxiliary register having first, second, third ... $p^{th}$ flip-flops with their 1 outputs connected to the inputs of said first, second, third ... $p^{th}$ AND gates, respectively, said first, second, third ... $p^{th}$ auxiliary register flip-flops carrying binary digits which are the most, second most, third most ... least significant of the number entered in said auxiliary register, a divide-by-$q$ divider, a third OR gate connected from the output of said AND gates to the input of said divider, an auxiliary flip-flop having set and reset inputs, and a 0 output, a differentiator connected from the output of said divider to the set input of said auxiliary flip-flop, said auxiliary flip-flop reset input being connected from the output of said first auxiliary differentiator, and a third auxiliary differentiator connected from said auxiliary flip-flop 0 output to the input of said first OR gate.

7. The invention as defined in claim 6, wherein $n = 4$, $m = 10$ and $q = 10$.

8. The invention as defined in claim 7, wherein $p = 8$.

9. The invention as defined in claim 1, wherein said third means includes a Kelvin-Varley function generator to produce a signal directly proportional to specific gravity in response to a manual setting equal to $G$, where $$G = 141.5/S - 131.5$$

where $S$ is specific gravity.

10. Apparatus for generating a serial group of pulses wherein the number of pulses in a group is equal to a known variable digital number, said apparatus comprising: a binary digital pulse counter including a logic circuit and at least first and second flip-flops connected therefrom; means to supply input pulses to said logic circuit at a pulse repetition frequency $2f$; at least first and second AND gates each having first and second inputs and an output, said counter first and second flip-flops having first and second 1 outputs, respectively, first means connecting said first counter flip-flop first 1 output to the first input of said first AND gate; second means connecting said second counter second 1 output to said second AND gate first input, said logic circuit being constructed to cause said counter first flip-flop to produce pulses at the 1 output thereof at a pulse repetition frequency $f$, said logic circuit being constructed to cause said counter second flip-flop to produce pulses at the 1 output thereof at a pulse repetition frequency of $f/2$; a storage register having at least first and second flip-flops corresponding to the most and next most significant digits, respectively, contained in said register; means to change the states of said register flip-flops in accordance with a function of a predetermined variable, said first and second register flip-flops each having a respective 1 output connected to the second inputs of said first and second AND gates, respectively; and an OR gate having first and second inputs connected from the outputs of said first and second AND gates, respectively, said first and second AND gates causing first and second sets of pulses, respectively, to be impressed on said OR gate first and second inputs, respectively, each of the pulses in said first set occurring at a time different from all those times at which the pulses of said second set occur.

11. The invention as defined in claim 10, wherein said first means includes a first differentiator, said second means including a second differentiator.

12. The invention as defined in claim 11, wherein both of said AND gates are sensitive to D.C. voltages of the same polarity, both of said AND gates being insensitive to all D.C. voltages of a polarity opposite said same polarity.

13. The invention as defined in claim 10, wherein both of said AND gates are sensitive to D.C. voltages of the same polarity, both of said AND gates being insensitive to all D.C. voltages of a polarity opposite said same polarity.

14. A pulse train modification circuit comprising: first means to supply input pulses, each of said input pulses having a lead edge and a trailing edge; an OR gate; an inverter having an input junction connected from said first means and an output junction; second means connected from one of said junctions to said OR gate to supply pulses to said OR gate approximately on the occurrence of the same one edge of at least a portion of said input pulses; a flip-flop having a set input, a reset input, and a 0 output; third means connected from at least one of said junctions and actuable to supply pulses to said set input at times different from the times at which both of said leading and trailing edges occur; fourth means connected from the other of said junctions to supply pulses to said reset input at approximately the same time that the same predetermined edge of each input pulse occurs, said predetermined edge being different from the said same one edge; and a differentiator connected from said 0 output to said OR gate.

15. The invention as defined in claim 14, including utilization means connected from the output of said OR gate.

16. The invention as defined in claim 15, wherein said first means includes a turbine flowmeter, said utilization means including a digital pulse counter connected from the output of said OR gate, and an indicator connected from said counter to indicate the magnitude of the number accumulated therein.

17. The invention as defined in claim 16, including means to supply an input to said third means to vary the ratio of the rate at which pulses are supplied to said set input and the rate at which said input pulses are supplied to said inverter input junction by said first means.

18. The invention as defined in claim 15, including means to supply an input to said third means to vary the ratio of the rate at which pulses are supplied to said set input and the ratio at which said input pulses are supplied to said inverter input junction by said first means.

19. The invention as defined in claim 14, including means to supply an input to said third means to vary the ratio of the rate at which pulses are supplied to said set input and the rate at which said input pulses are supplied to said inverter input junction by said first means.

* * * * *